United States Patent

Atwood et al.

[11] 3,872,662
[45] Mar. 25, 1975

[54] SPINNING AND TWISTING RING CONSTRUCTION

[75] Inventors: Hyatt B. Atwood, Buffalo; James N. McLean, Tonawanda, both of N.Y.

[73] Assignee: Herr Manufacturing Company, Inc., Tonawanda, N.Y.

[22] Filed: Sept. 26, 1972

[21] Appl. No.: 292,340

[52] U.S. Cl.................... 57/120, 138/40, 184/7 A, 184/100
[51] Int. Cl............................................ D01h 7/62
[58] Field of Search ...... 57/120, 119; 184/7 A, 7 R, 184/100, 52; 138/40

[56] References Cited
UNITED STATES PATENTS

| | | | |
|---|---|---|---|
| 1,868,574 | 7/1932 | Hofmann | 57/120 |
| 2,830,433 | 4/1958 | Raboisson | 57/120 |
| 2,867,076 | 1/1959 | Atwood | 57/120 |

FOREIGN PATENTS OR APPLICATIONS

| | | | |
|---|---|---|---|
| 727,611 | 3/1932 | France | 57/120 |
| 342,750 | 2/1931 | United Kingdom | 57/120 |

*Primary Examiner*—John W. Huckert
*Assistant Examiner*—Charles Gorenstein
*Attorney, Agent, or Firm*—Joseph P. Gastel

[57] ABSTRACT

A spinning and twisting ring construction comprising an upper annular portion and a lower annular portion pressed into engagement therewith with an interference fit, first and second contiguous surfaces on said upper and lower annular portions for defining a seam, a bearing surface formed by said first and second annular portion, a lubricant groove formed by adjacent portions of said upper and lower annular portions, slot means formed in said seam, said slot means having one end in communication with said lubricant groove and the opposite end terminating at said bearing surface for conducting lubricant to said bearing surface, a second bearing surface on the upper annular ring portion, a plurality of spot lubrication conduits extending between said lubricant groove and said surface, each spot lubrication conduit including a bore in said upper annular ring portion and a counterbore in communication therewith proximate said lubricant groove, a pin mounted within said bore annd having a portion in said counterbore which is larger than said bore to prevent removal of said pin from said bore, a plurality of second bores in said lower annular portion in communication with said groove for conducting lubricant to the outer annular surface of said lower annular portion, and a pin loosely mounted within each of said second bores. A spinning and twisting ring construction including an upper annular portion and a lower annular portion pressed into engagement therewith with an interference fit and first and second seams formed by said upper and lower annular portions lubricant groove formed by said upper and lower annular portions inn communication with said seams, with said first seam terminating at the inner annular surface of the ring and said second seam terminating at the lowermost surface of said ring, whereby said seams conduct lubricant from said lubricant groove to said surfaces.

5 Claims, 16 Drawing Figures

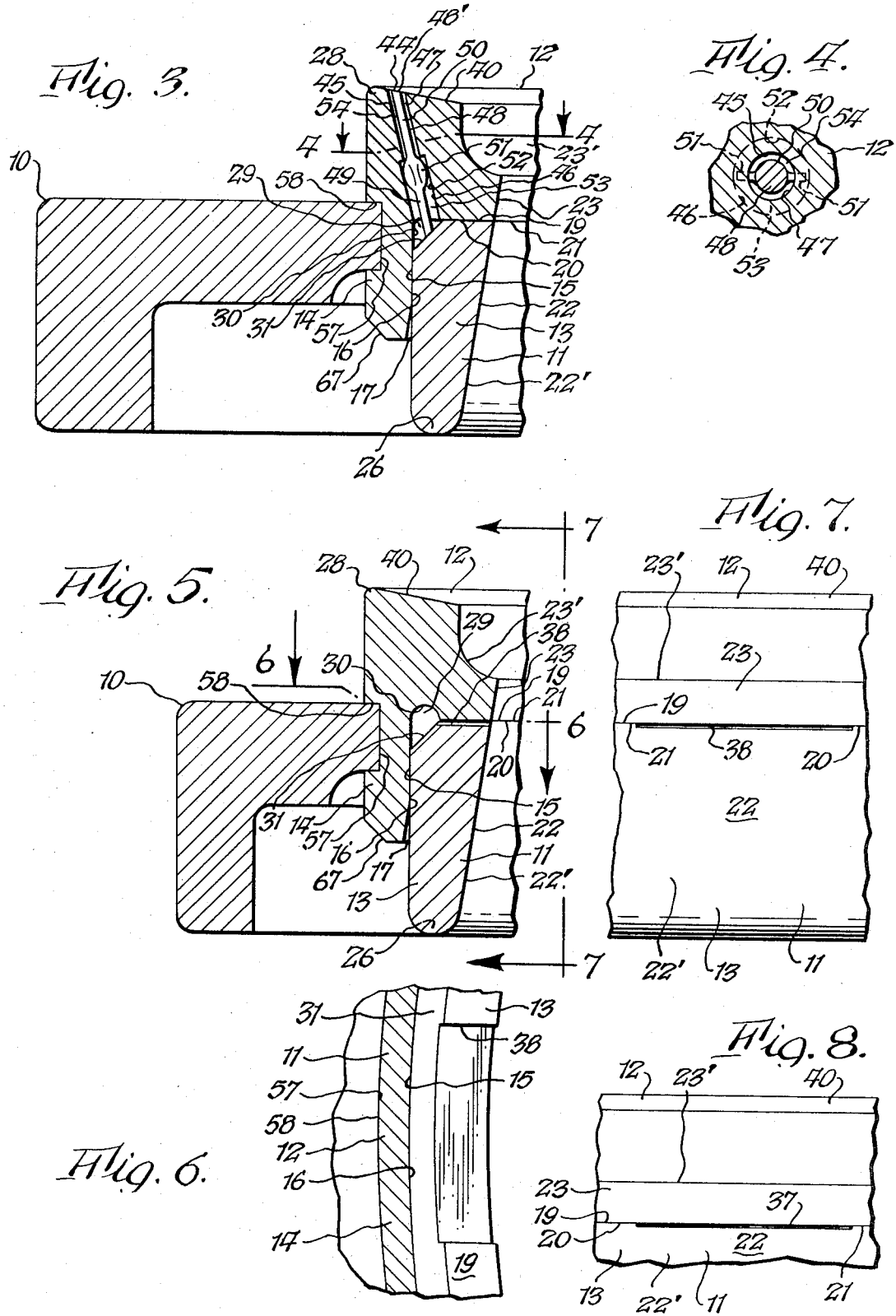

SPINNING AND TWISTING RING CONSTRUCTION

The present invention relates to an improved spinning and twisting ring construction.

By way of background, a spinning and twisting ring mounts a traveler which guides the thread associated therewith. This traveler, during its travel, will engage a plurality of surfaces of the spinning ring. These surfaces are the upper surface of the ring, the inner surface of the ring, and the outer lower surface of the ring. In the past the outer lower surface of the ring was lubricated by lubricant which passed from the inner surface, along the traveler by centrifugal force to the outer surface. However, such flow of lubricant was not obtained through a direct flow to the outer surface.

It is accordingly one important object of the present invention to provide an improved spinning and twisting ring construction which provides lubricant to three surfaces of a spinning and twisting ring in a positive manner.

Another object of the present invention is to provide an improved spinning and twisting ring construction in which lubricant is provided to the outer lower cylindrical surface thereof in a positive manner.

A further object of the present invention is to provide an improved spinning and twisting ring construction in which lubricant is supplied to at least three surfaces thereof from a central lubricant groove located within the ring.

A still further object of the present invention is to provide an improved spinning and twisting ring construction in which standard blanks can be modified as desired to provide any predetermined amount of lubrication to any of three surfaces thereof. A related object is to provide a spinning and twisting ring having the immediately preceding feature which is also simple to fabricate and reliable and efficient in operation.

Yet another object of the present invention is to provide an improved spinning and twisting ring construction in which lubricant is provided to the inner surface and the lowermost surface thereof through seams which are produced as a result of joining upper and lower spinning and twisting ring portions to each other by an interference fit. Other objects and attendant advantages of the present invention will readily be perceived hereafter.

One embodiment of the present invention, in its broadest sense, comprises an annular body portion having first, second and third surfaces, a lubricant groove in said body portion, and first, second and third conduit means for effecting communication between said lubricant groove and said first, second and third surfaces, respectively. In its more specific aspect, the first, second and third surfaces noted above are the outer lower surface, the top surface and the inner surface.

Another embodiment of the present invention comprises a spot lubrication construction for one of the surfaces of a spinning and twisting ring which includes a bore in the ring leading to said surface, a counterbore in communication with said bore, and a pin having a first portion in said bore and a second portion of greater diameter than said bore in said counterbore to prevent said pin from working out of said bore onto said surface.

In accordance with another embodiment of the present invention, a lubrication construction for a bearing surface of a spinning and twisting ring is provided by a first bore in communication with a lubricant groove within said ring, and a second bore in communication with said first bore and lying transversely thereto. In accordance with the more specific aspect of this portion of the invention, a pin is loosely held in said first bore and is prevented from leaving said first bore by the transverse orientation of the second bore relative to the first bore, the loose mounting of the pin within the bore providing a self-cleaning action of the first bore.

In accordance with a still further embodiment of the present invention, a spinning and twisting ring comprises first and second annular ring portions with one of the portions being secured to the other portion by an interference fit so as to provide first and second seams, and a lubricant groove in said ring in communication with said first and second seams to provide lubricant flow from the lubricant groove to the surface on said ring at which said seams terminate, said surfaces being the inner surface of the ring and the lowermost surface thereof.

The various aspects of the present invention will be more fully understood when the following portions of the specification are read in conjunction with the accompanying drawings wherein:

FIG. 3 is an enlarged fragmentary cross sectional view taken substantially along line 3—3 of FIG. 1 and showing the details of the structure for effecting spot lubrication of the upper bearing surface of the spinning ring;

FIG. 4 is a fragmentary cross sectional view taken substantially along line 4—4 of FIG. 3 and showing further details of construction of the conduit and core for effecting spot lubrication of the upper bearing surface;

FIG. 5 is a fragmentary cross sectional view taken substantially along line 5—5 of FIG. 1 and showing the relationship of the lubricating slot to the seam between the upper and lower ring portions;

FIG. 6 is a fragmentary cross sectional view taken substantially along line 6—6 of FIG. 5;

FIG. 7 is a side elevational view of the slot of FIG. 5 taken substantially in the direction of line 7—7 of FIG. 5;

FIG. 8 is a view taken substantially in the direction of line 8—8 of FIG. 1 and showing the smaller slot which is closer to the lubricant inlet;

Figure 1:
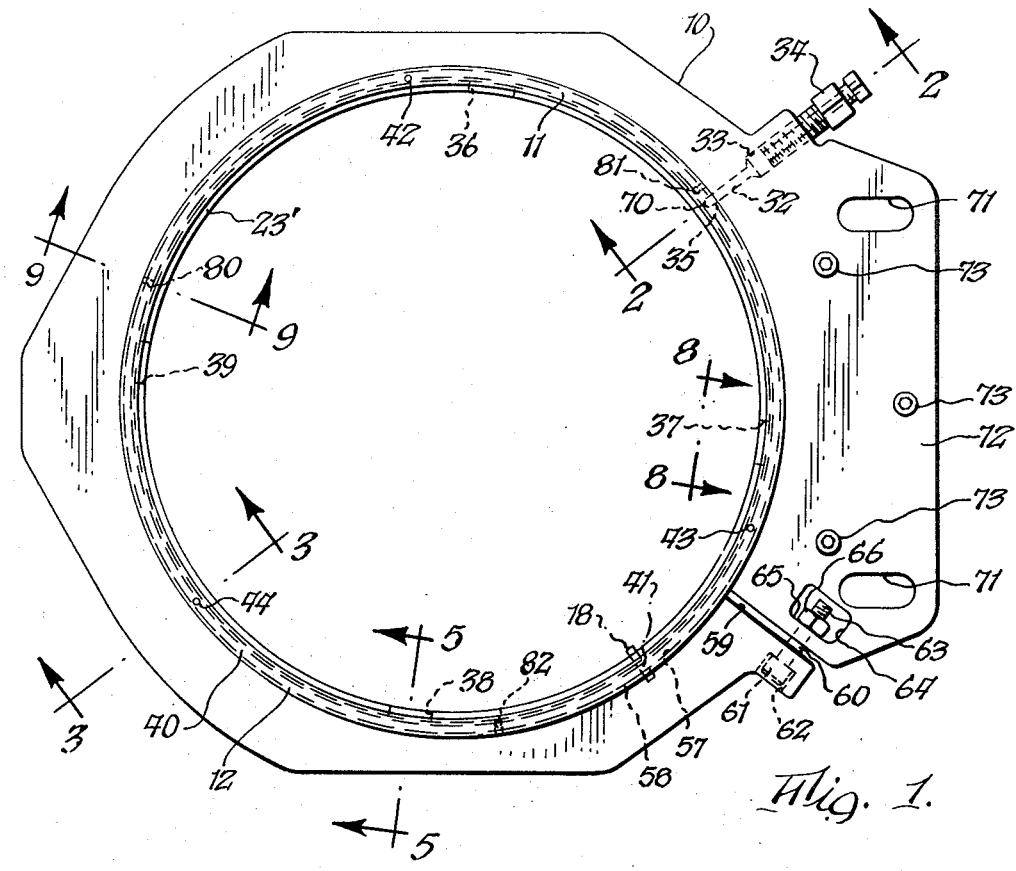
FIG. 1 is a plan view of the improved spinning ring of the present invention mounted in a holder.

The improved structure of the present invention includes a holder 10 mounting an annular spinning and twisting ring 11 (hereafter referred to as a spinning ring) consisting of upper annular ring portion 12 and lower annular ring portion 13 which is pressed into depending annular rim 14 so that cylindrical surface 15 of lower ring portion 13 engages inner cylindrical surface 16 of rim 14 with an interference fit. Suitable sealant is applied at cutaway area 17 to prevent leakage of lubricant through the joint defined by surfaces 15 and 16. Because the ring portions 12 and 13 are connected only by an interference fit, they can be separated for repair or replacement of either part, this having been impossible with prior types of rings which were fabricated of a single piece of material or in which the upper and lower ring portions were welded to each other.

The improved ring 11 of the present invention provides lubrication to three surfaces, namely, the inner surface, top surface, and outer surface to thereby insure that traveler 18 is lubricated in an optimum manner.

The seam lubrication is obtained as a result of lower ring portion 13 being in its installed position within upper ring portion 12. In this respect upper annular surface 19 of lower ring portion 13 will be in contiguous relationship to annular surface 20 of upper ring portion 12 so as to define a seam 21 therebetween. This seam provides an opening of suitable size to permit lubricant to pass therethrough onto the inner frustoconical bearing surface 22 consisting of surface 22' on the inside of lower ring portion 13 and surface 23 on upper ring portion 12 in alignment with surface 22'. Surface 23 terminates at annular recess portion 23' which provides clearance for a thread carried by traveler 18. The lubricant passing through seam 21 provides lubrication for the shank 24 of traveler 18 which has a foot portion 25 extending around the lower extremity 26 of lower ring portion 13. The top horn 27 of traveler 18 extends around the upper outer portion 28 of upper ring portion 12. The lubricant is supplied to seam 21 from an annular oil groove 29 which is defined by annular surface 30 of upper ring portion 12 and annular chamfered corner 31 of lower ring portion 13. The lubricant is conducted into annular oil groove 29 through bore or conduit 32 in holder 10, bore 32 effecting communication between tapped bore 33 and tube 32' located partially therein and partially in bore 35 in rim 14 of upper ring portion 12. Tube 32' is driven into bore 32 and the annular recess 35', which is produced by peening about tube 32', is filled with suitable sealant, in accordance with the teaching of U.S. Pat. No. 3,603,070. Suitable lubricant is supplied to fitting 34 by automatic pumping mechanism of conventional construction.

In addition to the seam lubrication described above, slot lubrication is also provided by an unique construction to insure the controlled flow of lubricant to traveler shank 24. In this respect, the upper surface 19 of lower ring portion 13 is milled to provide slots 36, 37, 38 and 39. After the ring portions 12 and 13 are assembled, the slots 36, 37, 38 and 39 function as lubricant conduits. As can best be seen from FIG. 1, slots 36 and 37 are substantially equidistant from lubricant inlet conduit 32. Slots 38 and 39 are also substantially equidistant from lubricant inlet conduit 32. Slots 36 and 37, which are relatively close to lubricant inlet conduit 32, are of lesser depth than slots 38 and 39. Thus, slots 36 and 37 have a smaller effective cross sectional area than slots 38 and 39. In practice, slots 38 and 39 are of a depth of approximately 5/1000ths of an inch and slots 36 and 37 are of a depth of approximately 3/1000ths of an inch. The significance of the foregoing is that slots 38 and 39 will provide the same amount of lubrication as slots 36 and 37 notwithstanding that they are further from lubricant inlet conduit 32 than slots 36 and 37 because the larger size of slots 38 and 39 compensates for the lower lubricant pressure at slots 38 and 39 than at slots 36 and 37. In other words, the sizes of the various slots are proportioned to obtain substantially equal lubricant flow, thereby assuring that the inner bearing surface 22 is adequately lubricated at all points for the shank 24 of the traveler. Where desirable seam 21 may be totally closed and in this event the slots would provide the entire lubrication to the inner bearing surface 22.

It can thus be seen that the lubrication slots can be customized for any particular application by varying their cross sectional area, as desired. In addition the number and location of the slots may be varied. All the foregoing can be done by merely milling the desired number and depth of slots onto the lower ring portion 13, as is required for optimum lubrication. This obviates the necessity for different lower ring blanks for different installations.

In addition to the above described seam and slot lubrication, spaced spot lubrication is provided for upper bearing surface 40, above which the head portion 41 of the traveler rides. This spot lubrication is effected at spots or points 42, 43 and 44 in FIG. 1, all of which contain identical structure and therefore the description will be limited only to spot 44. Lubrication at spot 44 is effected through conduit or bore 45 having its lower end 46 in communication with annular lubricant groove 29 and its upper end 47 terminating at upper bearing surface 40. A core or pin member 48 is permanently affixed within bore 45. More specifically, pin 48 includes a lower cylindrical portion 49, an upper cylindrical portion 50, which is of the same diameter as lower portion 49, and a central flattened portion 51 which is positioned in counterbore 52 and has a transverse dimension which is greater than the diameter of bore 45 so that it will not be able to work up out of upper end 47 of bore 45. The lower end of pin portion 49 rests on chamfered corner 31. The space 53 between lower pin portion 49 and counterbore 45 and the annular space 54 between upper pin portion 50 and bore 45 are in communication with each other. Thus lubricant can flow from one end 46 of bore 45 to the other end 47. It will be appreciated that the varying of the dimensions of the annular space 54 will vary the amount of lubricant flow through bore or conduit 45. This is effected by varying the diameter of pin portion 50. Top 48' of pin 48 is cut at an angle to lie flush with upper bearing surface 40. It will be appreciated that the amount of clearance between pin 48 and bore 45 may be the same at all the spots 42, 43 and 44 or may be varied, as required, to obtain optimum lubrication. In the event it becomes necessary to clean the lubricant conduits, it is merely necessary to inject compressed air into fitting 34.

In addition to the seam, slot and spot lubrication described above, additional spot lubrication is provided at spots or points 80, 81 and 82 for the purpose of lubricating the outer lower cylindrical side surface 83 of ring 11. Since spots or points 80, 81 and 82 all contain identical structure, the description will be limited only to spot 80 taken along line 9—9 of FIG. 1. Lubrication at spot 80 is effected by a bore 84 which has its upper end in communication with lubricant groove 29 and its lower end in communication with horizontal bore 85 which extends transversely to bore 84 and terminates at spot 80. Mounted loosely within bore 84 is a pin 86. By way of dimensions, pin 86 can be 0.036 inches, bore 84 can be 0.045 inches, and bore 85 can be 0.045 inches. It will be appreciated that by varying the relative dimensions of pin 86 and bore 84 the amount of lubrication which is provided at spot 80 can be regulated. In addition, since pin 86 is loose, it will "rattle" as lubricant flows through bore 84 to thereby provide a clearing action to prevent clogging of bore 84. It is to be noted at this point that lubricant spots 80, 81 and 82 are located equidistantly between adjacent lubricant spots 42, 43 and 44 for the purpose of causing lubricant emanating from the six various spots 42–44 and 80–82 to be at equidistantly spaced positions circumferentially of ring 11. It will be appreciated, however, that the spots can be positioned in any other way which is desirable and which will give the desired lubrication effect. In addition, it will be appreciated that the number of lubricant spots can be different than the number shown in FIGS. 1–10. For example, there may be any number of lubricant spots on the upper surface 40 and any other number on outer surface 83. It will thus be appreciated that when the traveler 18 is in operation and the outer end of foot portion 25 engages surface 83, the lubricant provided through spots 80–82 will facilitate the travel of traveler 18 in its desired manner with a minimum of friction.

Figure 11:
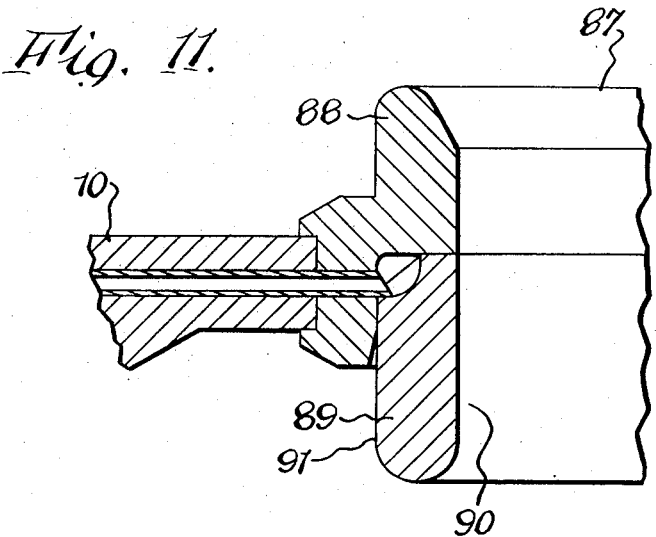
FIG. 11 is a fragmentary cross sectional view of an alternate embodiment of the present invention having an inner cylindrical surface rather than the frustoconical inner surface of the embodiments of FIGS. 1–10.
Figure 12:
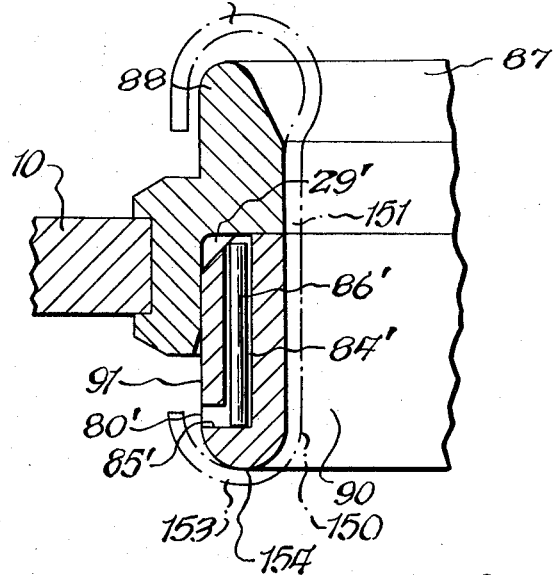
FIG. 12 is a fragmentary cross sectional view of the embodiment of FIG. 11 and showing the outer side wall spot lubrication structure.

FIGS. 11 and 12 depict in cross section an alternate embodiment of the present invention which differs from the embodiment of FIGS. 1–10. Spinning and twisting ring 87 is fabricated from upper annular ring portion 88 and lower annular ring portion 89 secured thereto with an interference fit. Lower ring portion 89 has a cylindrical inner surface 90 rather than the frustoconical bearing surface 22 of FIGS. 1–10. Except for the foregoing difference and except for the changes in shape which are apparent from a comparison of FIGS. 9 and 11, the embodiment of FIG. 11 can have all of the features of FIGS. 1–10 including the provisions for seam, slot, upper spot and outer lower wall spot lubrication, as described above with respect to FIGS. 1–10. It will be appreciated that any of the four types of provisions for lubrication can be omitted if desired.

FIG. 12 depicts the manner in which the spot lubrication is provided for outer cylindrical wall 91, by essentially the same structure as described above relative to FIGS. 9 and 10. In this respect a pin 86' is loosely mounted within bore 84' which is in communication with bore 85' which in turn terminates at spot 80', the upper end of bore 84' being in communication with lubricant groove 29'. The primed numerals represent structure which is analogous or identical to the structure shown in FIGS. 9 and 10 and bearing like unprimed numerals.

Figure 13:
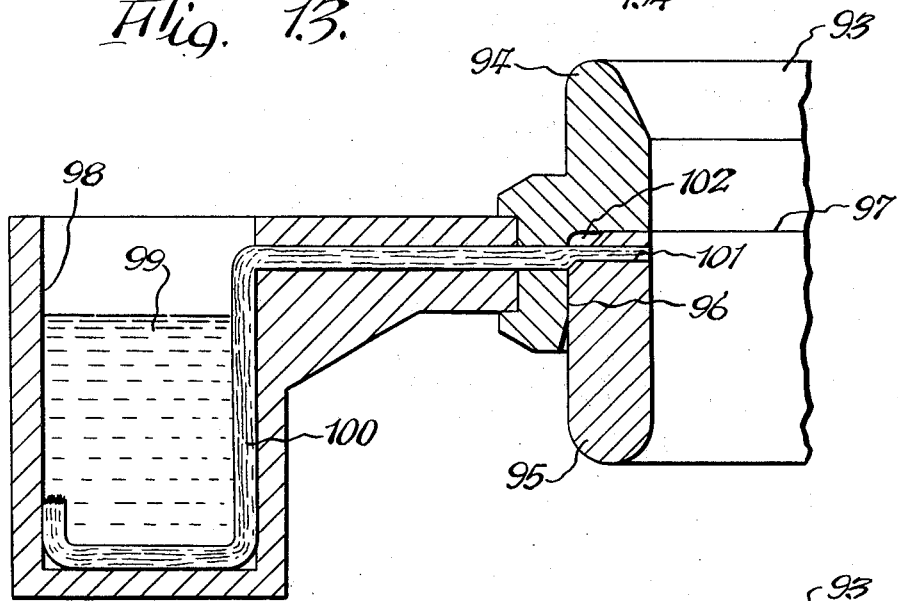
FIG. 13 is a fragmentary cross sectional view of a spinning and twisting ring structure similar to that shown in FIG. 11 but having manual lubrication rather than automatic lubrication.
Figure 14:
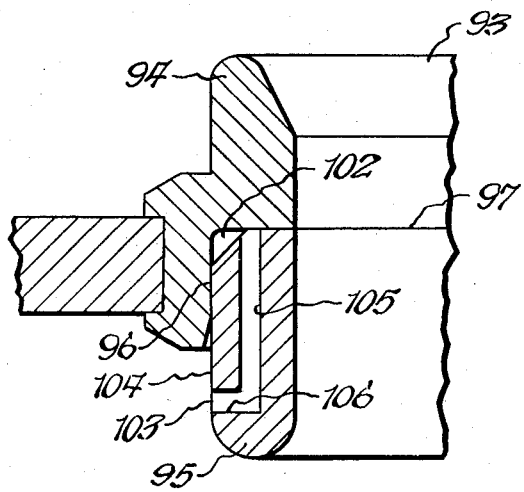
FIG. 14 is a fragmentary cross sectional view of the embodiment of FIG. 13 and showing structure for effecting outer side wall spot lubrication which does not utilize a pin in the conduit.

FIGS. 13 and 14 disclose a still further embodiment of the present invention. In this embodiment a spinning and twisting ring 93 is shown having an upper annular portion 94 and a lower annular portion 95 secured thereto by an interference fit at junction or seam 96. A lubrication seam 97 is provided which may also have slots therein such as discussed above in detail relative to FIGS. 1–9. However, instead of automatic lubrication such as discussed above relative to FIGS. 1–12, the embodiment of FIG. 13 includes manual lubrication which includes a lubricant reservoir 98 containing lubricant 99 which is supplied to wick 100 having its end secured in bore 101 in lower annular ring portion 95. An annular lubricant groove or channel 102 is provided at the junction of upper and lower annular ring portions 94 and 95 to distribute lubricant to seam 97 and the slots associated therewith. Spots such as 103 on outer cylindrical wall 104 are also supplied with lubricant from groove 102. In this respect there may be any number of spots such as 103 circumferentially spaced on the outer cylindrical surface 104. It is to be noted that lubricant groove 102 is in communication with bore 105 which in turn is in communication with bore 106 leading to spot 103. In the embodiment of FIGS. 13 and 14 a loose pin such as 86 of FIG. 9 has been omitted and the bore 105 is completely open. It will be appreciated of course that this same construction without a pin therein can also be used in the embodiment of FIGS. 1–10 and FIGS. 11–12. However, in such instances the dimensions of bore 105 will have to be adjusted accordingly.

Figure 15:
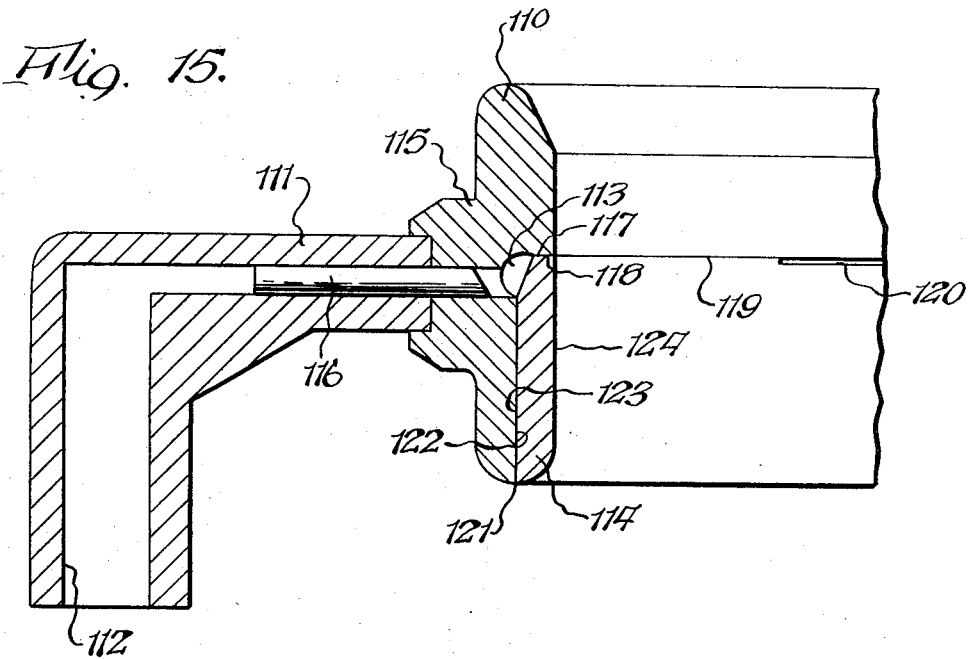
FIG. 15 is a fragmentary cross sectional view of a spinning ring construction which provides seam lubrication at the lowermost edge thereof and which utilizes automatic lubrication.

In FIG. 15 a still further embodiment of the present invention is shown. In this embodiment, which possesses automatic lubrication of the type discussed above relative to FIGS. 1–10, a spinning and twisting ring 110 is mounted on holder 111 which has a lubricant inlet supply conduit 112 in communication with annular lubricant groove 113 formed at the junction of portions of inner annular spinning ring portion 114 and outer annular spinning ring portion 115. In this embodiment lubricant tube 116 is provided between ring portion 115 and holder 111 and this construction may be identical to that shown in U.S. Pat. No. 3,603,070. The upper surface 117 of inner ring portion 114 forms a seam with lower surface 118 of outer ring portion 115 so as to define a seam 119 which may have slots 120 circumferentially located therein. This seam and slot structure may be identical to the structure discussed above relative to FIGS. 1–10. However, the embodiment of FIG. 15 differs from the preceding embodiments in that seam lubrication is provided at the lowermost portion of annular seam 121 which is formed at the junction of inner annular surface 122 of ring portion 115 and outer annular surface 123 of ring portion 114, surfaces 122 and 123 being in engagement with an interference fit. In this manner the lower foot portion of a traveler, such as foot 25 of traveler 18, is lubricated during its travel. In a ring such as shown in FIG. 15 the only lubrication which is required is the seam and slot lubrication 119–120 for inner cylindrical ring surface 124 and the seam lubrication at annular seam 121.

Figure 16:
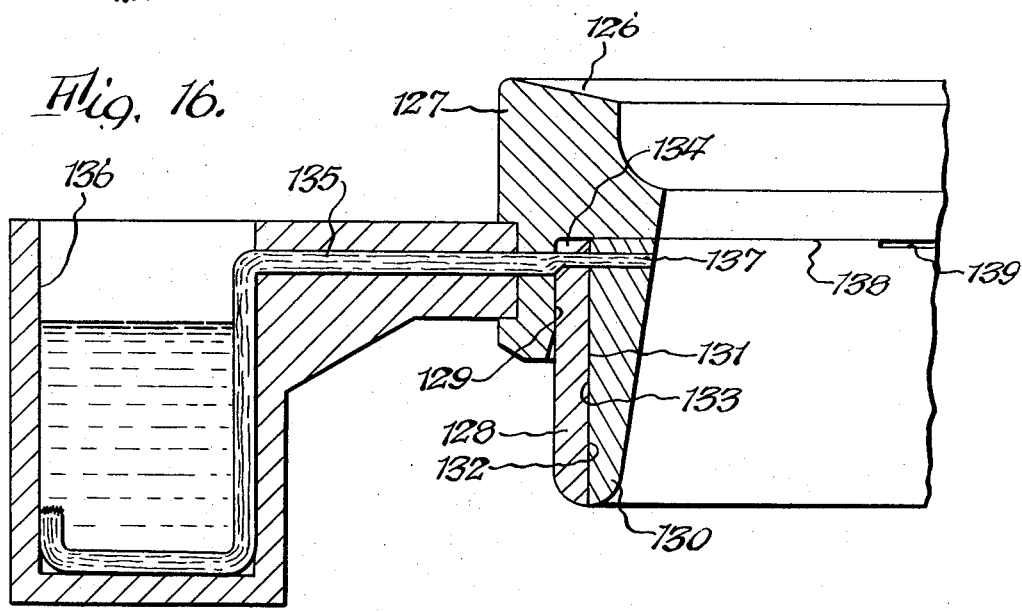
FIG. 16 is a fragmentary cross sectional view of a spinning ring construction which includes structure for providing seam lubrication at the lowermost portion thereof and which utilizes manual lubrication.

FIG. 16 shows an alternate embodiment of the ring of FIG. 15 wherein the spinning and twisting ring 126 includes an upper annular portion 127, a lower outer annular portion 128 which is secured within annular portion 127 by an interference fit at junction 129 and a lower inner annular portion 130 which is secured to outer annular portion 128 with an interference fit at seam 131. Seam 131 is formed by inner surface 132 of portion 128 and surface 133 of portion 130. A lubricant groove 134 is provided between portions 127 and 128 and lubricant is supplied to groove 134 through wick 135 which has its outer end immersed in lubricant reservoir 136 and its inner end 137 secured to inner lower annular ring 130. Lubricant slots such as 139 may be provided circumferentially on seam 138 which is formed at the junction of adjacent parts of the inner lower annular ring portion 130 and upper annular ring portion 127. Lubricant for the foot portion of the traveler is provided at the lowermost portion of seam 131. While upper spot lubrication bores, such as 42, 43 and 44 of FIG. 1 are not shown in FIG. 16, it will be appreciated that they can be provided and that the lubricant feed to surface 126 will be obtained by capillary action if the diameter of the bores are of a proper size.

Figure 2:
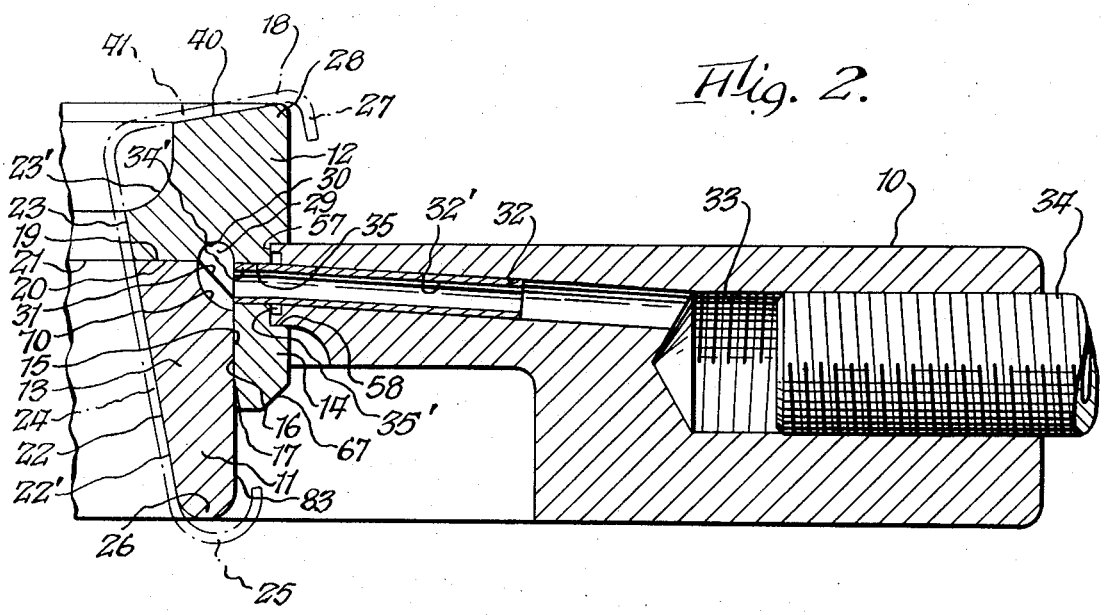
FIG. 2 is an enlarged fragmentary cross sectional view taken substantially along line 2—2 of FIG. 1 and showing the details of construction of the holder and the spinning ring in the area of the lubricant inlet.
Figure 9:
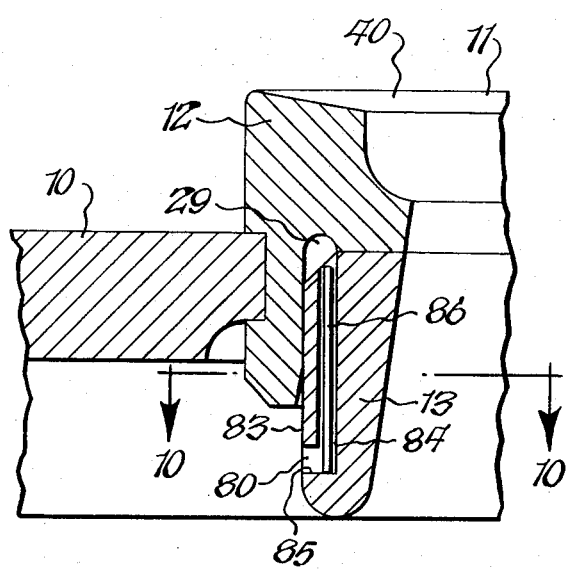
FIG. 9 is a fragmentary cross sectional view taken along line 9—9 of FIG. 1 and showing the structure for effecting outer wall spot lubrication.
Figure 10:
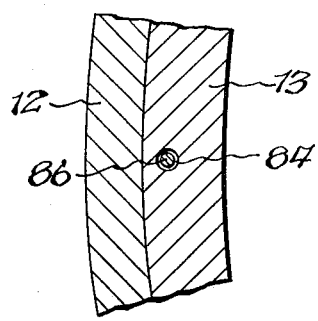
FIG. 10 is a fragmentary cross sectional view taken substantially along line 10—10 of FIG. 9.

The assembled ring 11 is mounted in holder 10 by causing the inner annular peripheral surface 57 of holder 10 to be received in annular groove 58 in the outer side of upper ring portion 11. Holder 10 is a casting which has a continuous annular form except for split 59. The head 61 of bolt 60 is received in recess 62 and the end 63 of bolt 60 is received in recess 64 having a shoulder 65 on which nut 66 bears when the nut and bolt assembly is tightened. Before the nut and bolt are tightened, the holder is slipped upwardly onto upper ring portion 12, and to this end an annular chamfer 67 is provided to act as a cam surface over which holder 10 travels. By suitable cocking during the assembly of ring 11 and holder 10, as described in detail in U.S. Pat. No. 3,603,070, the end 34' of tube 32' is inserted into bore 35, so that the final assembly will be as shown in FIG. 2. Upon tightening of nut 66, holder 10 will clamp onto upper ring portion 12. The ring 11 may be selectively inserted and removed from holder 10, as required.

A notch 70 (FIGS. 1 and 2) is provided in chamfered surface 31. This notch has a circumferential dimension of approximately 1/16th of one inch and is used during assembly of the ring portion as a reference point in effecting alignment between bore 35 in upper ring portion 12 and lower ring portion 13 to insure that the slots 36, 37, 38 and 39 are located in their intended positions relative to lubricant inlet bore 35. Furthermore, because the slot has a slight width, any slight misalignment between the upper and lower ring portions will not impede the proper flow of lubricant. Apertures 71 are provided in holder portion 72 for mounting holder 72 on a frame and screws 73 are for leveling the assembled unit.

In FIG. 12 a traveler 150 is shown for mounting on any of the spinning rings having a cylindrical inner surface, as in FIGS. 11–15. Traveler 150 includes a shank 151, a head portion 152 and a foot portion 153. During rotation the action of the traveler 150 is upwardly and outwardly so that it assumes the position shown in FIG. 12 wherein the engagement is between the inner cylindrical face 90 and shank 151 and between the foot portion 153 and the bottom radius 154, as shown. Thus, whenever spinning rings having an inner cylindrical surface are used, the lubrication is directed primarily to the inner cylindrical surface 90 and the bottom radius 154. The lubrication is supplied to surface 90 by the seam, such as 97 (FIG. 13), which may also include spaced slots, and the lower radius 154 is lubricated by lubricant which flows downwardly from spots such as 80' to radius 154 (FIG. 12) or by lubricant which passes through seam 121 (FIG. 15).

It can thus be seen that the various embodiments of the present invention are manifestly capable of achieving the above enumerated objects and while only certain embodiments have been disclosed, it will be appreciated that the present invention is not limited thereto but may be otherwise embodied within the scope of the following claims.

What is claimed is:

1. A spinning ring comprising an annular body portion, a lubricant groove in said body portion, a bearing surface on said body portion, and conduit means for effecting communication between said lubricant groove and said surface, said conduit means including a bore proximate said surface and a counterbore remote from said surface, and pin means including a first pin portion of lesser diameter than said bore in said bore for providing a lubricant channel therewith, and a second pin portion in said counterbore, said second pin portion being of a larger size than said bore to prevent said pin means from moving outwardly toward said bearing surface and said second pin portion being of a configuration so as to permit communication between said bore and said counterbore.

2. A spinning ring as set forth in claim 1 wherein said annular body portion includes a first annular ring portion and a second annular ring portion secured on said first annular ring portion with an interference fit, and wherein said conduit means is located in said second annular ring portion, and wherein said lubricant groove is formed by adjacent parts of said first and second annular ring portions, and wherein said counterbore is in communication with said lubricant groove.

3. A spinning ring comprising first and second annular ring portions, said first annular ring portion including a cylindrical inner surface and a first shoulder surface, said second annular ring portion including an outer cylindrical ring surface for placement in contiguous substantially abutting engagement with said inner cylindrical surface to define a first lubricant-conducting seam therebetween, and a second shoulder surface on said second annular portion for placement in contiguous substantially abutting engagement with said first shoulder surface to define a second lubricant-conducting seam therebetween, a lubricant groove formed by adjacent parts of said first and second annular rings in communication with first ends of said first and second seams, and first and second bearing surfaces on said ring at the opposite ends of said first and second seams, respectively, whereby lubricant is conducted to said first and second bearing surfaces through said first and second seams, respectively.

4. A spinning ring comprising an annular body portion, a lubricant groove in said body portion, a bearing surface, conduit means for effecting communication between said lubricant groove and said bearing surface comprising a first conduit portion in communication with said lubricant groove and a second conduit portion extending transversely to said first conduit portion to conduct lubricant from said first conduit portion to said surface, and pin means in said first conduit portion for providing a channel with said first conduit portion.

5. A spinning ring as set forth in claim 4 wherein said pin means comprises an elongated pin held loosely in said first conduit portion, with said transversely extending second conduit portion preventing said elongated pin from moving out onto said bearing surface.

* * * * *